3,370,299
PULSED LIGHT WRITING SYSTEM
Gardner P. Wilson, Pasadena, Calif., assignor to Clevite Corporation, a corporation of Ohio
Filed Aug. 23, 1965, Ser. No. 481,868
7 Claims. (Cl. 346—109)

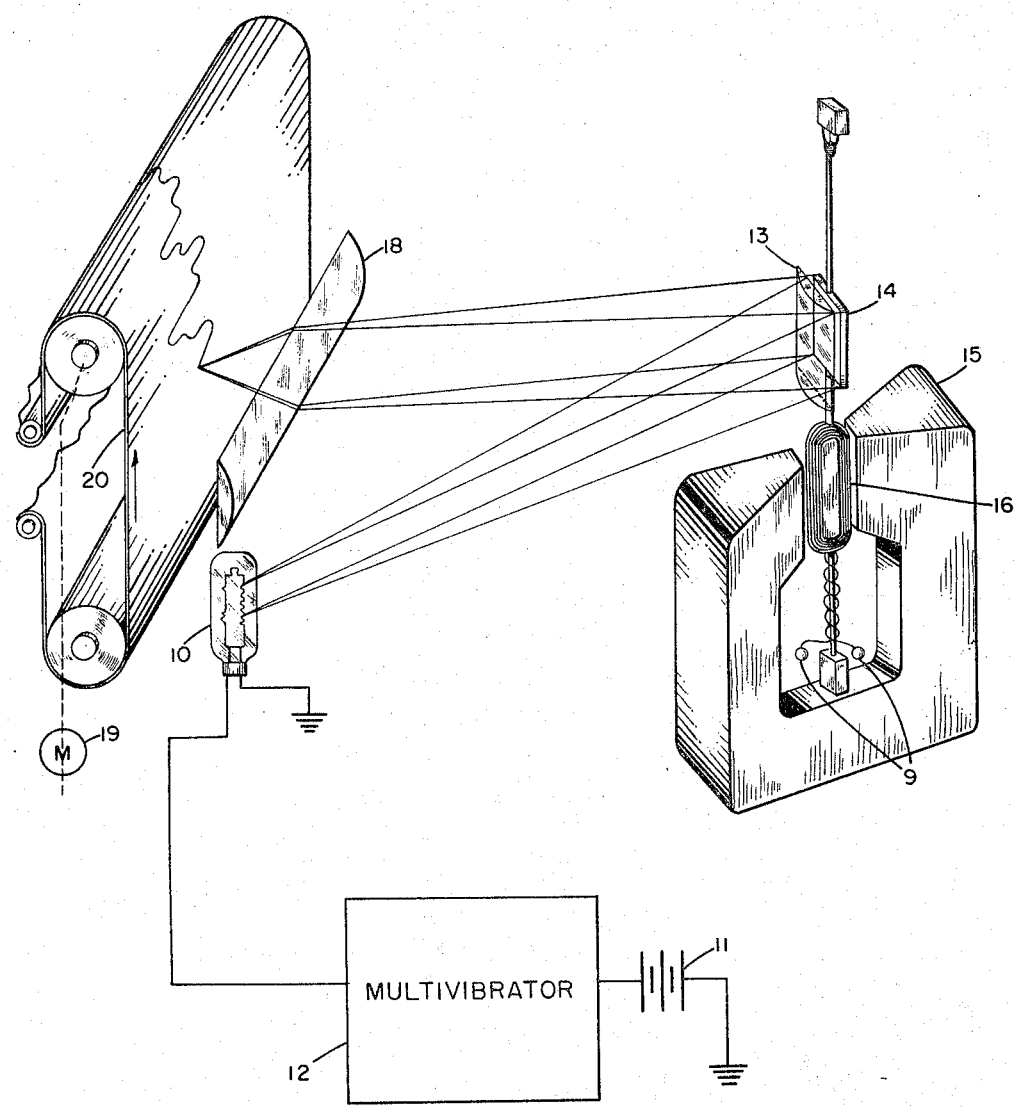

This invention relates to a light recorder system for direct recording of data, and more particularly to the direct recording of analog data on photographic oscillograph paper.

There has long been a need for a low powered oscillograph; for example, one that can be run by storage batteries such as flashlight batteries.

It is an object of the present invention to provide a light recording system utilizing light sensitive photographic paper for recording analog data.

Another object of the invention is to provide a lightweight, battery powered light recorder for recording analog data on photographic paper.

Another object of the invention is to provide a light recorder utilizing paper which fails to obey the well known reciprocity laws, and to provide a system for recording thereon analog data in the form of an apparently continuous line.

For a better understanding of the present invention, together with other and further objects thereof, reference is had to the following description taken in connection with the accompanying drawings, and its scope will be pointed out in the appended claims.

An aspect of the present invention lies in the provision of a direct recorder for recording analog data on light sensitive photographic paper wherein means are provided for moving the paper past a spot of intense light which is reflected from a mirror. The mirror is vibrated in accordance with the signal to be recorded to cause the spot to sweep across the record paper, thereby leaving a trace. The light source is energized by circuit means which includes means for pulsing the lamp so that it is rapidly turned "on" and "off," thus applying to the film a series of closely spaced dots which together form a trace in accordance with the signal vibrating the mirror.

This invention is related to the invention shown in United States application Ser. No. 439,394, filed Mar. 12, 1965, in the name of Gardner P. Wilson and Rafn Stefansson, for a Light Recorder, now Patent No. 3,245,083. It is also related to the invention shown in United States Patent 3,150,914, issued Sept. 29, 1964, in the names of Gardner P. Wilson, Rafn Stefansson and Antoni Szymanski, for Means for Applying Timing Marks.

It has been found that a battery powered oscillograph operating with a continuously energized lamp is impractical. The light intensity is too low for effectively recording a good trace on direct recording photographic film or paper. A second disadvantage which has been discovered is that at low paper speeds the direct writing photographic paper becomes desensitized by the edges of the slow moving light spot, so that by the time the bright center of the spot arrives, the paper has become so desensitized that its writing speed is badly impaired and a poor trace results. This occurs due to the non-linear behavior of the paper in regard to the well-known reciprocity laws.

In order to provide a low powered, low speed oscillograph operating from flashlight batteries, the lamp shown in Ser. No. 439,394 is pulsed instead of operated continuously. The device and circuit shown in Patent 3,150,914 for pulsing the flash lamp 21 may be used. Or, in place of the mechanical chopper an all-electronic chopper or multi-vibrator may be used, as is known in the art. The important feature being that the lamp is pulsed.

In Patent 3,150,914 a gas lamp such as a xenon lamp is shown, and in Ser. No. 439,394 an incandescent lamp is shown. Either may be used in the present invention. The benefits derived from pulsing the lamp are as follows:

First, by turning on the lamp for short pulses, a high light level is achieved during the peak, yet the average power used can be low if a considerable off period is left between pulses. (Short duty cycle.) This means certain types of lamps, which are normally used at low average input power, can be used at high peak powers and high peak efficiencies without overrating them. Secondly, at very low paper speeds we find that direct writing photographic oscillograph paper tends to become densensitized by the edges of a very slow moving spot. By the time the center of the spot arrives, the paper becomes so desensitized that its writing speed is badly impaired and very poor traces result. This occurs due to the non-linear behavior of the paper in regards to the well-known reciprocity laws. By pulsing the light, a new area of paper is presented to the center of the spot for each pulse, thus avoiding this desensitizing from the encroaching edge of the spot. The result is each photolyzed mark made by the light pulses is dark, resulting in a good, contrasting trace. Thirdly, higher effective writing speed per expended watt can be achieved due to the non-linear behavior of direct writing photographic paper. The writing speed of this paper increases approximately as the square of the incident light intensity. By pulsing the light, we can get high peak powers and even higher writing speed, without increasing the average power expended. For instance, if we take a continuous lamp of 10 watts input power, we might write at 10,000 inches per second. If we pulse this same lamp at 100 watts peak input, at $\frac{1}{10}$ duty cycle, the average input power will be still 10 watts, but the writing speed during the peak period might be increased by a factor of $10^2$ or 100, giving 1,000,000 inches per second. One thing can be traded for another by taking advantage of the paper's non-linearity, and the average power can be greatly reduced, without impairing writing speed.

A by-product of the above is that a tungsten filament may be pulsed at higher than normal operating temperature, without shortening its average life. Its color temperature at luminous efficiency would be higher and would be more effective on the photographic paper.

The resulting traces from the pulsed techniques are made up, of course, of a string of tiny dots. To plot a reasonably readable wave, a number of dots per cycle of the data wave must be used. This means that the recorded data wave can be some fraction of the frequency of the pulsed light source. If a pulse rate of 100 c.p.s. is used, and a data frequency of 1 c.p.s. is recorded, 100 dots per cycle are used to plot the data wave.

For best results the photographic paper should be of the photolyzing or latensifying type which does not obey the well-known reciprocity laws.

As shown by the figure a length of photographic paper 20 is driven by motor 19 past a lens 18. A gas lamp or an incandescent lamp 10 has its light output focused by lens 13 on mirror 14 which is vibrated by coil 16 mounted in a magnet 15. The signal to be recorded is applied to the coil 16 through input terminals 9 as is known in the art.

Lamp 10 is connected to battery 11 by means of an electronic multi-vibrator 12 by means of a mechanical chopper so that the energy to the lamp 10 is pulsed on and off at a rather rapid rate. The lamp output is a series of short, bright flashes interspersed by longer periods without light, and the trace on the film 20 is in the form of many small dark dots, effectively forming a continuous trace, as shown.

Preferably the "off" period of the lamp should be longer than the "on" period; for example, it might be "on" for 10% of the time and "off" for 90% of the time, which would give a 1/10 duty cycle. This permits greatly increasing the peak watts input without exceeding the average power to the bulb, with consequent greater light intensity for recording each dot on the photographic paper 20.

The bulb 10 may be a xenon lamp which cannot be continuously energized and have an appreciable life, but which gives off a brilliant light mostly in the visible spectrum.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A light system for the direct recording of data comprising, in combination:
   direct writing light sensitive paper,
   means steadily moving said paper in a given direction,
   a light source,
   means including a mirror and optical element means for focusing light from said source as a light spot on said moving paper,
   means for vibrating said mirror in accordance with a signal to be recorded to cause said light spot to move across said paper in accordance with the data to be recorded,
   and circuit means for energizing said light source including means for pulsing said light source at a substantially constant on-off repetition rate whereby there is recorded on the paper a series of closely spaced but distinct dots substantially evenly spaced along the direction of motion of the paper, and whereby the dots are of substantially equal recorded density.

2. A system as set forth in claim 1, further characterized by said circuit means turning said light source on and off so that it has a longer "off" period than "on" period.

3. A system as set forth in claim 2, further characterized by said light source being energized during its "on" period by higher peak input than its average rating for continuous use.

4. A system as set forth in claim 3, further characterized by said circuit means for energizing said light source including a battery.

5. A system as set forth in claim 4, further characterized by said light source comprising a xenon light source.

6. A system as set forth in claim 4, further characterized by said light source comprising an incandescent light source.

7. A system as set forth in claim 4, further characterized by said paper comprising photographic paper which photolizes or latensifies.

References Cited

UNITED STATES PATENTS

| | | | |
|---|---|---|---|
| 1,798,689 | 3/1931 | Legg | 346—109 |
| 2,458,882 | 1/1949 | Stoner et al. | 346—107 |
| 2,496,392 | 2/1950 | Hasbrook | 346—23 |
| 2,775,503 | 12/1956 | Peterson | 346—109 |
| 3,006,713 | 10/1961 | Klein et al. | 346—108 |
| 3,245,083 | 4/1966 | Wilson et al. | 346—109 |

RICHARD B. WILKINSON, *Primary Examiner.*

J. W. HARTARY, *Assistant Examiner.*